United States Patent
Upadhyaya et al.

(10) Patent No.: US 12,109,649 B2
(45) Date of Patent: Oct. 8, 2024

(54) LASER WELDING METHOD FOR ENHANCED WELD QUALITY AND ENHANCED SURFACE SMOOTHNESS

(71) Applicant: SECRETARY, DEPARTMENT OF ATOMIC ENERGY, Mumbai (IN)

(72) Inventors: Brahma Nand Upadhyaya, Indore (IN); Pushkar Misra, Indore (IN); Suresh Chandra Vishwakarma, Indore (IN); Rajesh Arya, Indore (IN); Srikant M. Oak, Indore (IN); Purushottam Das Gupta, Indore (IN)

(73) Assignee: SECRETARY, DEPARTMENT OF ATOMIC ENERGY, Mumbai (IN)

( * ) Notice: Subject to any disclaimer, the term of this patent is extended or adjusted under 35 U.S.C. 154(b) by 731 days.

(21) Appl. No.: 16/999,814

(22) PCT Filed: Feb. 24, 2018

(86) PCT No.: PCT/IB2018/051168
§ 371 (c)(1),
(2) Date: Aug. 21, 2020

(87) PCT Pub. No.: WO2019/162726
PCT Pub. Date: Aug. 29, 2019

(65) Prior Publication Data
US 2021/0354240 A1 Nov. 18, 2021

(51) Int. Cl.
*B23K 26/21* (2014.01)
*B23K 26/32* (2014.01)
*B23K 103/14* (2006.01)

(52) U.S. Cl.
CPC .............. *B23K 26/21* (2015.10); *B23K 26/32* (2013.01); *B23K 2103/14* (2018.08)

(58) Field of Classification Search
CPC ..... B23K 26/21; B23K 26/32; B23K 2103/14
See application file for complete search history.

(56) References Cited

U.S. PATENT DOCUMENTS

| | | |
|---|---|---|
| 4,159,686 A | 7/1979 | Heim |
| 4,369,348 A | 1/1983 | Stetson et al. |
| (Continued) | | |

FOREIGN PATENT DOCUMENTS

| | | | | |
|---|---|---|---|---|
| EP | 1747836 A1 | * | 1/2007 | ......... B23K 26/0604 |
| WO | WO-2018136622 A1 | * | 7/2018 | ............. A61B 18/22 |

OTHER PUBLICATIONS

International Search Report; Application No. PCT/IB18/51168/; mailed Jun. 18, 2018; 3 pages.
(Continued)

*Primary Examiner* — Janie M Loeppke
*Assistant Examiner* — Theodore J Evangelista
(74) *Attorney, Agent, or Firm* — CANTOR COLBURN LLP

(57) ABSTRACT

An improved laser welding method of materials by means of long pulse and high energy pulses of solid state lasers in such a manner that large depth of penetration with full depth or partial depth of penetration can be achieved with minimum surface evaporation in first pass of laser beam and enhanced surface smoothness having average surface smoothness of 5 mm by second pass of laser beam of lower power density and inclined at a particular inclination.

9 Claims, 3 Drawing Sheets

(56) References Cited

U.S. PATENT DOCUMENTS

| | | | | |
|---|---|---|---|---|
| 5,347,528 A | * | 9/1994 | Haruta | B23K 26/0648 219/121.64 |
| 6,710,282 B2 | | 3/2004 | Sonoda et al. | |
| 6,740,845 B2 | | 5/2004 | Stol et al. | |
| 6,900,410 B2 | | 5/2005 | Tsukamoto et al. | |
| 8,803,029 B2 | | 8/2014 | Forrest et al. | |
| 2016/0167169 A1 | * | 6/2016 | Khare | B23K 26/282 219/121.63 |
| 2017/0274473 A1 | * | 9/2017 | Naito | B23K 26/0676 |
| 2018/0045232 A1 | * | 2/2018 | Capostagno | B23K 26/22 |
| 2018/0304404 A1 | * | 10/2018 | Kagiya | B23K 26/60 |

OTHER PUBLICATIONS

Written Opinion; Application No. PCT/IB18/51168/; mailed Jun. 18, 2018; 5 pages.

"A highly efficient and compact long pulse Nd:YAG rod laser with 540 J of pulse energy for welding application" by Choubey A, Vishwakarma SC, Misra P, Jain RK, Agrawal DK, Arya R, Upadhyaya BN, Oak SM, Rev Sci Instrum. Jul. 2013; 84(7):073108.

"Measurement of the composition change in Al5754 alloy during long pulsed Nd : YAG laser welding based on LIBS" by M Jandaghi, P Parvin, M J Torkamany and J Sabbaghzadeh, Journal of Physics D: Applied Physics, vol. 42, No. 20.

* cited by examiner 13  14

15

16

LASER WELDING METHOD FOR ENHANCED WELD QUALITY AND ENHANCED SURFACE SMOOTHNESS

CROSS REFERENCE TO RELATED APPLICATIONS

This is a US National Stage of Application No. PCT/IB2018/051168, filed on Feb. 24, 2018, the disclosure of which is incorporated herein by reference.

FIELD OF THE INVENTION

The present invention relates to a method of laser welding in which high energy and long duration pulses are used to achieve large depth of penetration using a single pulse or an overlap of pulses with minimum surface evaporation in first pass of laser beam and achieving a good surface smoothness in second pass by shining the laser beam on the weld bead at a particular inclination and with sufficient spot overlap.

BACKGROUND AND PRIOR ART

Laser welding is a method of joining metal components using a focused beam of coherent light to melt adjoining components and allowing the melt to solidity into a joint. Laser beam welding is known to provide a highly concentrated, limited amount of heat, resulting in a small heat affected zone (HAZ), distortion, and shrinkage. Laser welding is being used worldwide for welding of various materials in different shapes and configurations. The most widely used methods of laser welding are conduction welding and keyhole welding. In conduction welding, low energy and short duration pulses are used so that the peak power density is sufficient to melt the surface and surface evaporation does not take place. In this case, weld depth is limited to about 1 mm due to low energy of the laser. If the energy is increased with same pulse duration, peak power density becomes high enough to ablate surface of the welded material.

In keyhole type welding, the laser beam may cause a portion of metal in the interface to volatilize to produce a keyhole bounded by molten metal. The keyhole advances with the movement of the laser beam. Molten metal solidifies behind the advancing keyhole to create a joint between the components. In keyhole type of welding, it is common to use either CW lasers or CW lasers with modulations with peak power density on the surface to reach to evaporation temperature of the material so that a keyhole is formed and duty cycle is such that the keyhole is sustained. In such keyhole welding, heat affected zone will be much more and welded surface will not be smooth. In low repetition rate lasers which are normally used for conduction welding, duty cycle will not be sufficient to sustain keyhole.

In "Measurement of the composition change in Al5754 alloy during long pulsed Nd:YAG laser welding based on LIBS" by M Jandaghi, P Parvin, M J Torkamany and J Sabhaghzadeh, Journal of Physics D: Applied Physics, Volume 42. Number 20, use of long pulse Nd:YAG laser for keyhole welding in aluminium alloy 5754 is disclosed. Furthermore, for a given, material, there is a threshold peak power density above which keyhole welding can be performed and this peak power density varies from material to material for example, it has a value of $\sim 10^7$ W/cm$^2$ for the case of steel. In keyhole welding process, it is a must that material surface has to reach its vaporization temperature, so that a vapour channel in the form of a keyhole is achieved.

In "A highly efficient and compact long pulse Nd:YAG rod laser with 540 J of pulse energy for welding application" by Choubey A, Vishwakarma S C, Misra P, Jain R K, Agrawal D K, Area R, Upadhyaya B N, Oak S M, Rev Sci Instrum. 2013 July; 84(7):073108, there is disclosure of flash lamp pumped long pulse Nd:YAG laser capable of generating 1 kW of average output power with maximum 540 J of single pulse energy and 20 kW of peak power. The laser pulse duration can be varied from 1 to 40 ms and repetition rate from 1 to 100 Hz. A compact and robust laser pump chamber and resonator was designed to achieve this high average and peak power. A slope efficiency of 5.4% was achieved, which is on higher side for typical lamp pumped solid-state lasers. This system is highly useful in laser welding of materials such as aluminium and titanium. 4 mm deep penetration welding of these metals under optimized conditions of output power, pulse energy, and pulse duration is achieved. The laser resonator was optimized to provide stable operation from single shot to 100 Hz of repetition rate. The beam quality factor was measured to be $M^2 \sim 91$ and pulse-to-pulse stability of ±3% for the multimode operation. The laser beam was efficiently coupled through an optical fiber of 600 μm core diameter and 0.22 numerical aperture with power transmission of 90%.

"U.S. Pat. No. 6,740,845", discloses a method for minimizing the violent volatilization of metal within the keyhole wherein the conduction mode can eliminate the instabilities inherent with the keyhole mode. As a result, the conduction mode minimizes the formation of voids in the laser welds. However, implementation of this approach necessitates using very powerful lasers (e.g. 18 kW to 25 kW, depending on the application) and costly laser generating systems, which makes the approach impractical for many industrial applications.

U.S. Pat. No. 6,900,410 discloses a pulse modulated laser for keyhole welding and avoids various disadvantages of the prior art. According to U.S. Pat. No. 6,900,410 in the laser welding with the output-pulse-modulated laser beam, the pulse laser output is controlled to conform to the frequency of the reciprocation motion and is thereby periodically varied.

Conventionally, there are known methods such as those represented by YAG laser welding intended to prevent weld defects such as porosities, cracks, and spatter in accordance with laser output variations. U.S. Pat. No. 6,900,410 does not specifically limit the types of welding-target materials and welding materials which is important as a basic technique of the laser-using keyhole welding. Further, U.S. Pat. No. 6,900,410 emphasises upon prevention of porosities that can occur in a zinc-plated steel sheet. In addition, also the laser oscillator may be of an arbitrarily type as long as the output thereof can be pulse-modulated. However, defects are caused on the surface due to a high vapour pressure of zinc.

Another approach to increase the effectiveness of laser welding is described in (U.S. Pat. No. 4,369,348 by oscillating the laser beam at frequencies of over 1000 Hz. This very rapid movement of the laser is intended to distribute and time average the intensity of the laser at a frequency greater than the thermal response time of the metal. In this manner, the time averaged intensity of heat experienced by a particular location at the interface between the metal components being joined is greater than the intensity of heat experienced without oscillation. However, operation of a laser beam at oscillation frequencies of over 1000 Hz is difficult and costly.

U.S. Pat. No. 6,740,845 which discloses simultaneous translation of the focused beam along the joining region in a first direction and oscillating the beam relative to the molten pool at a direction different from the first direction wherein the keyhole is continuously moved and immediately refilled by the adjoining molten metal. Welding takes place as the keyhole penetrates through the molten pool and melts the components being welded at the interface there between. In the vicinity of the focused laser beam, the molten pool is vaporized to produce a keyhole which is translated with the oscillating beam. As the beam oscillates in a direction different from the first direction (e.g. transverse to the first direction), the keyhole oscillates through the pool of molten metal and molten metal fills into the keyhole as the keyhole oscillates. In this manner, the keyhole is continuously produced and then is refilled with molten metal that solidifies to produce a weld. The oscillations may be linear, circular, elliptical, or a combination thereof, or any other shape that accomplishes a moving keyhole. The thinner of the metal components may be over 0.1 inch thick. U.S. Pat. No. 6,740,845 allows laser joining various types of joints with customized weld dimensions (e.g. 0.25 inch interfacial weld width between 0.25 inch thick components) up to about 0.50 inch wide.

Although, laser welding methods have been disclosed by various prior arts, which are either based on laser beam manipulation and its control for process industry, real time viewing techniques during laser welding process or for manufacturing by means of laser welding of different components for a particular device.

As seen from above, at low levels of peak power density, the laser beam interacts only with the surface of the parts being welded wherein; the energy is transferred to the atoms on the surface, subsequently heating up and in turn transferring heat to the atoms below the surface. This mode of welding where the beat is transferred to the interior by conduction is called conduction mode welding. Typically conduction mode welds form when the peak power density is relatively low and the spot is relatively large. Conduction mode welds are common with low energy pulsed welding. Cross sections of conduction mode welds have a bowl shaped profile and are relatively shallow having weld depth to width ratio less than unity. The size and shape of the section profile depends upon the material properties and rate of energy input. Thus, in the case of conduction mode welding, penetration depth is limited due to conduction of most of the heat on the surface forming a wider weld bead, whereas less heat is conducted to increase the depth of penetration.

However, none of the disclosures have provided a method of laser welding, which uses a high energy long pulse solid state laser for deep penetration welding of materials with an enhanced weld quality and enhanced surface smoothness with protection of surface evaporation and minimized HAZ, distortion and shrinkage.

The present invention is conceived in view of difficulties in achieving large depth of penetration in conduction mode of welding and in achieving good surface smoothness in keyhole mode of welding.

Accordingly, there is a need for a simple and affordable laser welding method which can be used to achieve large depth of penetration with minimum surface evaporation and surface smoothness.

Objects of the Invention

An object of the present invention is to tide over the problem of the prior art.

Another object of the present invention is to provide a laser welding method which can be used to achieve large depth of penetration with minimum surface evaporation so as to achieve high surface smoothness.

Another object of the present invention is to generate a high energy and lone pulse solid state laser with controlled pulse duration, pulse frequency, and pulse shape in time domain.

Yet another object of the present invention is to smoothen the edges of the weld bead and provide a better match with the parent materials being joined by shining a laser beam at an inclination such that it covers a width more than the width of the weld bead.

SUMMARY OF THE INVENTION

Thus according to one aspect of the present invention there is provided a laser welding method for enhanced weld quality and enhanced surface smoothness, said method comprising steps of:
a. delivering a high energy and long pulse solid state Nd: YAG laser beam in first pass on material to be welded;
b. delivering a Nd: YAG laser beam in second pass with welding nozzle inclined at an angle from normal of weld bead and power density lower than the first pass;
   such that the first pass has peak power density below the peak power density required for evaporation of a surface to be welded and
   such that the inclination of the second pass lies in a plane, which does not contain the weld bead and direction of motion is in the direction of motion for full depth penetration or is opposite to the direction of motion for full depth penetration;
   wherein delivery of the laser beam in the second pass is carried out with the welding nozzle inclined at an angle 20°-45°, preferably 30° from normal of weld bead.

BRIEF DESCRIPTION OF THE ACCOMPANYING DRAWINGS

The above and other objects, aspects, features and advantages of the present invention will become more apparent from the following detailed description when taken in conjunction with accompanying drawings, in which.

Figure 1:
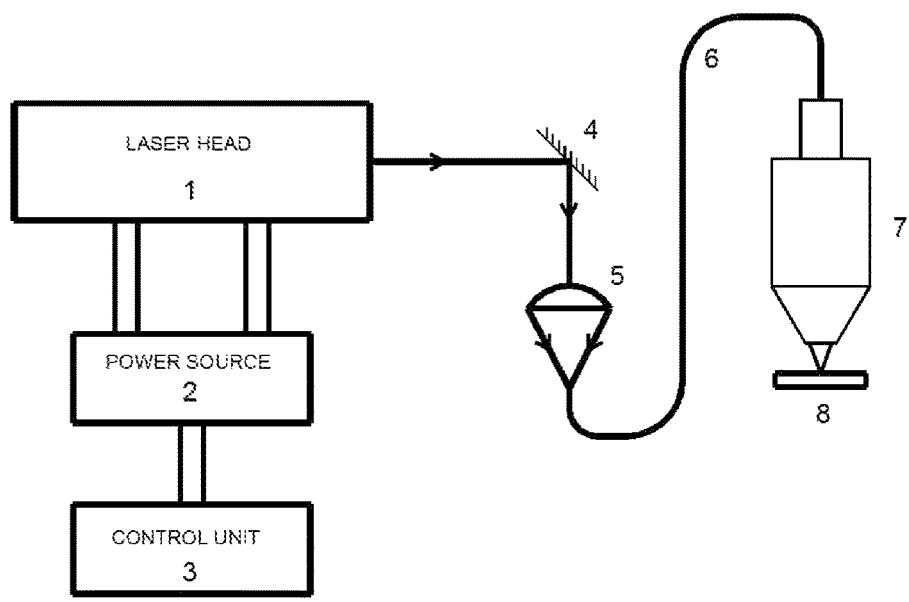
FIG. 1 illustrates laser welding set up using large energy and long duration Nd:YAG laser with fibre optic beam delivery.

Persons skilled in the art will appreciate that elements in the figures are illustrated for simplicity and clarity and may have not been drawn to scale.

DETAILED DESCRIPTION OF THE INVENTION

The present inventors have found a welding regime, which falls in between conduction and keyhole welding, where no evaporation of surface takes place during welding process and weld depth of penetration is dependent only on pulse energy, pulse duration and peak power.

The present method includes laser welding for enhancing weld quality and minimum surface evaporation wherein the process involves delivering a high energy and long pulse solid state laser in a first pass through fibre optic beam delivery with proper focusing objective to achieve peak power density below the value required for evaporation of surface of the material. In the said method, a second pass comprises of purging an inert gas through at least one welding nozzle tangentially on the weld bead in the direction opposite to the direction of motion of job to be welded.

The terms and words used herein are not limited to the bibliographical meanings, but, are merely used by the inventor to enable a clear and consistent understanding of the present disclosure.

All terms (including technical and scientific terms) used herein have the same meaning as commonly understood by one of ordinary skill in the art to which various embodiments belong. Further, the meaning of terms or words used herein should not be limited to the literal or commonly employed sense, but should be construed in accordance with the spirit of the disclosure to most properly describe the present disclosure.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also. Expressions such as "at least one of," when preceding a list of elements, modify the entire list of elements and do not modify the individual elements of the list.

The present inventors have found that if a single pulse of high energy and long duration, which is sufficient to melt up to a certain depth in the material and its peak power density is below the peak power density for evaporation of the material, is incident on the weld surface, large depth of penetration without surface evaporation can be achieved. Further, by controlling its repetition rate such that sufficient cooling between the pulses results in low HAZ (Heat Affected Zone).

As evaporation is avoided in present invented mode of pulsed laser welding, no keyhole formation takes place. Unlike Choubey et as mentioned above, who have achieved weld depth of 4 mm at power density of ~0.5 MW/cm$^2$, with aspect ratio of weld depth to width more than 1 indicating keyhole welding (apparent from FIGS. 12(*a*) and (*b*) of paper), which is characterized by larger aspect ratio of weld depth to width, no keyhole welding is done in the present method.

Present invention provides a way to overcome the undulations and to enhance surface smoothness for real field applications such as in radio frequency (RF) applications, where RF field penetrates only up to skin depth in the material, in which a second pass of laser beam is applied by means of directing laser beam of love power density, which is just sufficient to melt the undulations on the surface with beam diameter covering the whole weld bead and with spot overlap sufficient to minimize surface roughness. Thus good quality surface smoothness of 5 µm is achieved in the present invention in two pass welding.

The present invention provides a method for laser welding for minimum surface evaporation in the first pass comprising of pulse energy in the range wherein the operation is at single shot to hundreds of Hertz repetition rate may be used to achieve large depth of penetration.

The high energy long pulse in Nd:YAG lasers used for the purpose of present invention uses master oscillator or master oscillator power amplifier (MOPA) configuration in which a seed laser oscillator of low pulse energy is amplified by using cascaded amplifier pump cavity.

The second pass comprises, the inclination of Nd:YAG laser beam with respect to weld bead being kept at an angle from the normal of the weld bead, wherein, it lies in a plane, which does not contain the weld bead and direction of motion is in the direction of motion for full depth penetration or is opposite to the direction of motion for full depth penetration. When the beam is inclined at an angle, beam striking on the surface may have an elliptical shape with its major axis as $2\omega \cdot \cos\theta$, which has a larger size than the beam striking at normal incidence. Further, when the beam lies in a plane which does not contain the weld bead, it melts the undulations of the weld bead with area larger than the weld bead size across its cross-section and melts the edges of weld bead to enhance smoothness.

The method involves long pulse duration and very high energy pulsed solid state laser in first pass with pulse duration in the range of 1 ms-100 ms and pulse energy in the range of 100 mJ-1000 J, are operated at single shot to hundreds of Hertz repetition rate are used to achieve large depth of penetration in the range of 1-10 mm, preferably 4 mm to 10 mm. The average power used is from 1 W to 10 kW and peak power up to 40 kW.

The pulse duration is long enough such that the peak power density on the material is below the peak power density required for surface evaporation. The said high energy and long duration pulses are delivered on the material either directly or through a fiber optic beam delivery system with a suitable focusing objective to achieve focus spot diameter, which provides a peak power density below the peak power density required for evaporation of material. For a given pulse energy and pulse duration, focus spot diameter is to be such that peak power density is below the peak power density required for evaporation of the surface.

A range of power density of $10^4$-$10^8$ W/cm$^2$ depending on the material and its absorption are used in first pass. Low HAZ along with minimum distortion and shrinkage is achieved by means of laser beam, which is in the form of pulses in the millisecond region and its temporal shape was made to have a fast or slow or constant heating and cooling rates; and its repetition rate was controlled such that sufficient cooling of the weld bead between the pulses were achieved.

Sufficient cooling of the weld bead between the pulses is achieved by controlling the repetition rate and temporal shape is able to provide low heat affected zone, low distortion and low shrinkage of the material component being welded.

The laser welding is performed in an inert atmosphere by purging an inert gas through the welding nozzle and also a jet of inert gas is purged tangentially on the weld bead in the direction opposite to the direction of motion of job being welded. Inert gases such as helium or argon or nitrogen are useful. The inert gases are used to protect the oxidation of the weld bead from ambient atmosphere. It is needed to purge inert gas such that a curtain is formed, which protects atmospheric gases from entering the weld pool. In such cases it is essential to use an inert gas to avoid oxidation. However, in cases where oxidation of weld pool is not of any concern, it may not be used and such welding can also be performed in vacuum.

The inventors of the present invention have found the surprising effect of the second pass in achieving surface smoothness/roughness of 5 µm. A single pass results in surface smoothness of 500 µm. The use of second pass to improve the surface quality is not reported in literature. Further, in the second pass the welding nozzle is inclined at an angle normal to the weld bead and power density is reduced by increasing diameter of laser beam on the weld bead. The parameters for the second pass are completely different from that of the first pass.

In the second pass a Nd:YAG laser beam of low power density is used so as to achieve good surface smoothness having average surface roughness less than 5 µm. Low power density second pass for surface smoothness has a range of $10^3$-$10^6$ W/cm$^2$. The said surface smoothening of welded surface is achieved by passing the laser beam on the weld bead at an inclination between 20-45°, preferably 30° with respect to the normal to the weld bead. This lies in a plane which does not contain weld bead and the direction of motion is in the direction of motion for full depth penetration or is opposite to the direction of motion for full depth penetration.

When the power density for second pass for surface smoothness is outside the range of $10^3$-$10^6$ W/cm$^2$, the desired effect is not found. Further such laser beam for smoothening and incident at an inclination covers a width more than the width of the weld bead such that the edges of the weld head also get smoothened and provide a better match with the parent materials being joined. When the angle of inclination is beyond 20° to 45° the desired smoothness is not achieved.

The said laser welding can be used for all metals, metal alloys, weldable dissimilar metals, and other materials which can be welded with the adapted laser and can be used for all type of weld joints, such as butt joint, lap joint, circular joints, linear joints, fillet joint, T joint, etc.

DESCRIPTION OF SPECIFIC EMBODIMENT OF THE INVENTION WITH REFERENCE TO DRAWINGS

The invention is now described with the following non-limiting drawings and examples FIG. 1 illustrates, a Nd:YAG laser welding setup comprising of a fiber optic beam delivery. It includes a laser head 1 containing pump chamber for Nd:YAG rod, laser resonator for generation of laser beam. An electrical power source 2 is provided for flash lamps in pump chamber, an electronic control unit 3 to control pulse energy, pulse duration and pulse frequency during laser operation. A mirror 4 inclined at 45° to direct the laser beam for fiber optic beam delivery and a lens system 5 for high energy laser beam coupling in optical fiber 6 is provided.

A laser beam focusing objective 7 to focus the laser beam with required power density on work piece 8.

Figure 2:
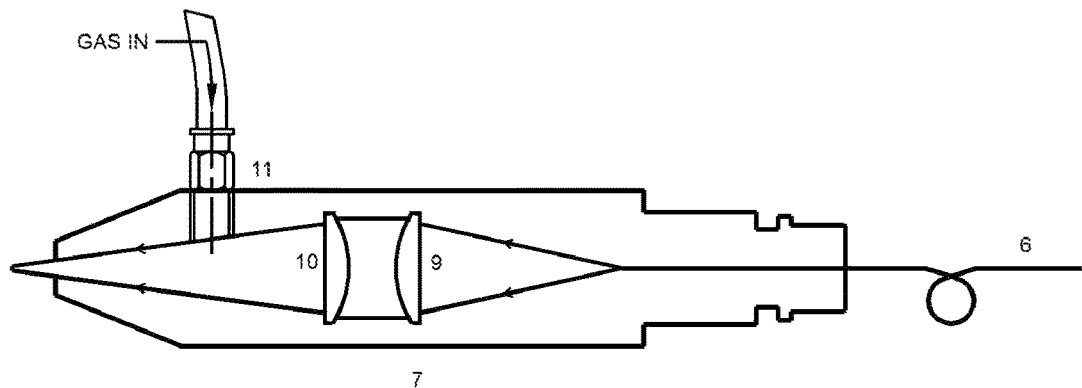
FIG. 2 illustrates laser welding objective and nozzle after fiber optic beam delivery.

FIG. 2 illustrates a laser welding objective containing a gripping arrangement for optical fiber 6; an enclosure 7 to hold optics for beam focusing; a combination of lenses 9 and 10 to collimate and focus the beam after beam exits optical fiber 6; an inlet 11 for inert gas to provide inert gas shroud during welding to prevent oxidation of workpiece 8.

Example 1

Method: A laser is used for butt welding of 4 mm thick Titanium sheets according to the method of present invention. The welding is carried out by using 200 J of pulse energy, 30 ms pulse duration and 2 Hz repetition rate. Further, surface smoothening of weld bead is carried out in second pass by using low energy pulses of 30 J pulse energy, 10 ms duration and 6 Hz repetition rate by inclined beam as shown in FIG. 5.

The power density used during first pass is $10^6$ W/cm$^2$ and during second pass is $10^5$ W/cm$^2$. The overlap of pulses is 80-90%.

Figure 5:
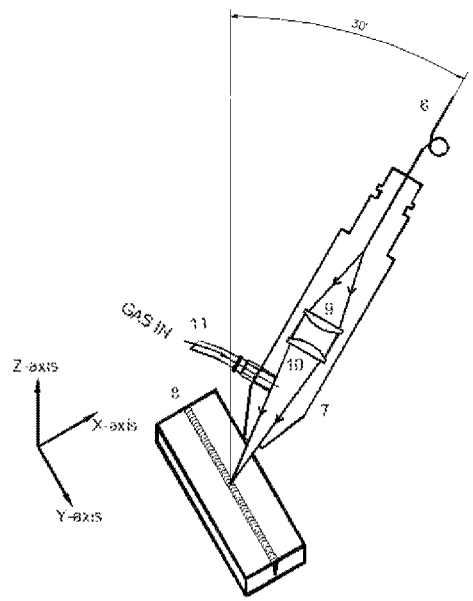
FIG. 5 illustrates inclination of laser beam from laser welding objective for surface smoothening with respect to weld head used in the embodiment.

FIG. 5 shows inclination of laser beam from laser welding objective for surface smoothening with respect to weld bead in which laser beam has been made incident at an inclination of 30°, from the normal of the weld bead and lies in a plane which does not contain the weld bead and direction of motion is opposite to the direction of motion for full depth penetration. While welding and smoothening, argon gas was purged on the weld bead with a flow rate of 30 lpm.

Result: Full depth of penetration with minimum HAZ, minimum distortion and minimum shrinkage is obtained. The welded material is obtained with smooth surface and no undulations on the top and bottom side with smoothness of 5 µm.

Comparative Example 1a

Method: The same method is followed as in example 1. But the power density used in the second pass is $10^2$ W/cm$^2$.

Results: The surface melting does not occur, only the heating of surface takes place and without surface melting, surface undulations are not removed.

Comparative Example 1b

Method: The same method is followed as in example 1. But the power density used in the second pass is above $10^6$ W/cm$^2$, i.e. $10^7$ W/cm$^2$ Results: The surface evaporation occurs which degrades the surface quality.

Inference: Thus, for surface smoothness, power density of second pass has to be $10^3$ to $10^6$ W/cm$^2$. Even with similar pulse energy, pulse duration and pulse overlap factor but power density beyond this range surface undulation appears. Accordingly, for full depth welding all the above features and overlap of pulses should be high enough (~80-90%) to achieve an enhanced surface smoothness.

Comparative Example 1c

Method: The same method is followed as in example 1. But the laser beam for the second pass for surface smoothening with respect to weld bead has been made incident at an inclination of 10°, which is beyond the range of 20° to 45°.

Result: The smoothness achieved is of the order of ~100 micron, which is much beyond that achieved in the present invention ie. 5 µm.

Figure 3:
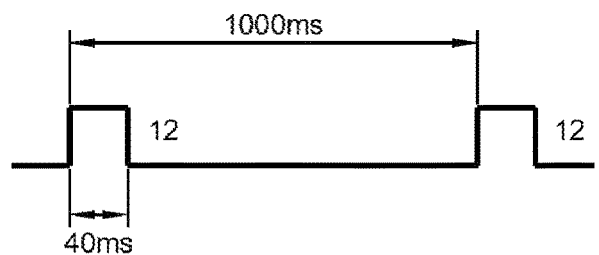
FIG. 3 illustrates a typical pulse shape of laser beam in time domain.

FIG. 3 illustrates a laser pulse of 40 ms duration with rectangular profile in time domain having 40 ms ON-time and 960 ms OFF-time at 1 Hz frequency, and its shape can be changed to have ramp-up, ramp-down, rectangular or trapezoidal shape by programming the flash lamp current, where 12 shows profile of laser pulse in time domain with ON and OFF time of the laser pulse.

Pulse profile in time domain is important as it provides an indication of uniformity of peak power density on surface for duration of laser pulse ON-time. If the pulse has any initial peak in time, it will be helpful in welding of low absorption materials such as copper, whereas if material is highly absorptive such as SS, initial peak in time will increase the power density beyond evaporation temperature and surface smoothness will degrade.

It is evident from FIG. 3 that laser is ON for 40 ms and OFF for 960 ms in 1 sec. of time, so that there is larger time for cooling to have lower HAZ and also shows that there is no peaking of power density and power density is approximately same for the range of pulse of 40 ms duration.

Figure 4:
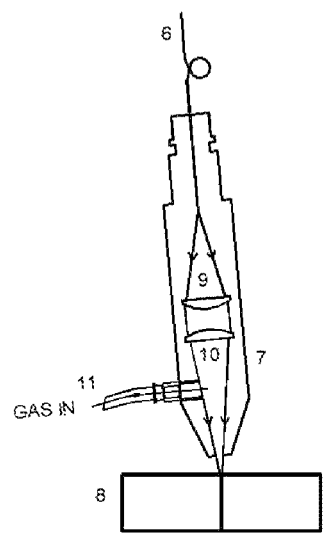
FIG. 4 illustrates laser welding objective positioning for deep penetration welding used in the embodiment.

FIG. 4 shows laser welding objective positioning for deep penetration welding in which welding objective has been inclined at an angle to prevent reflected beam from entering back in the nozzle and fiber.

When laser beam falls on the surface of a material, some portion of it is absorbed and some portion of it is reflected, so for a highly reflecting material such as copper, reflection will be higher and reflected laser light will enter back into the nozzle to damage the fiber end if the nozzle is perpendicular to the surface. However, if the nozzle is inclined at an angle, reflected light will not enter the nozzle and damage of fiber end is avoided. It is important that hope the nozzle has to be positioned for welding. This Figure shows the appropriate position the nozzle to be so as to achieve appropriate welding.

Figure 6:
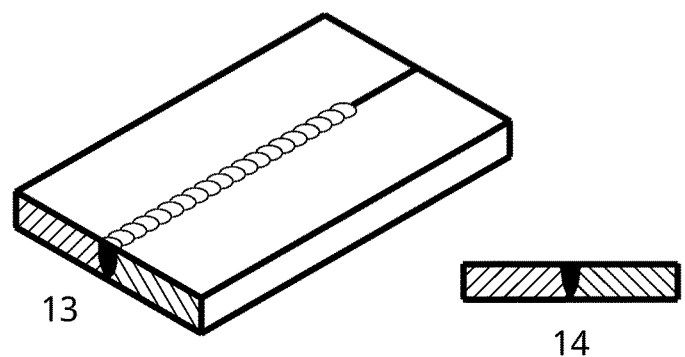
FIG. 6 illustrates a sectional view of seam weld bead on butt joint of material obtained in the embodiment.

FIG. 6 illustrates top view 13 of the seam weld bead on butt joint of the material with a side cross sectional view 14 of weld bead.

Figure 7:
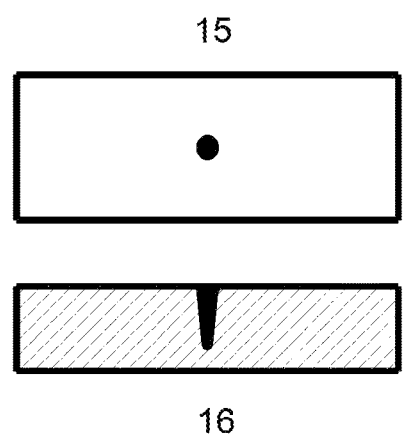
FIG. 7 illustrates a sectional view of single spot weld bead and weld depth in the material obtained in the embodiment.

FIG. 7 illustrates a top view of single spot weld bead 15 and cross sectional view of weld depth 16 in the material.

Based on the above-mentioned results, some of the non-limiting advantages of the present invention are:

Large depth penetration varying in the range of 1 mm-10 mm

Minimum surface evaporation

Enhanced surface smoothness having average surface smoothness of 5 µm.

Although a method of laser welding for enhancing weld quality with large depth of penetration for minimum surface evaporation and surface smoothness have been described in language specific to structural features, it is to be understood that the embodiments disclosed in the above section are not necessarily limited to the specific methods or devices described herein. Rather, the specific features are disclosed as examples of implementations, which provides a method of laser welding for enhancing weld quality with large depth of penetration for minimum surface evaporation and surface smoothness.

The invention claimed is:

1. A laser welding method for enhanced weld quality and enhanced surface smoothness, said method comprising steps of:
   a. delivering a high energy and long pulse solid state Nd: YAG laser beam in a first pass on a material to be welded;
   b. delivering a Nd: YAG laser beam in a second pass with a welding nozzle inclined at an angle from normal of a weld bead and a power density of the laser beam in the second pass is lower than a power density of the laser beam in the first pass;
   such that a peak power density of the first pass is below a peak power density required for evaporation of a surface of the material to be welded without forming a keyhole; and
   such that an inclination of the second pass lies in a plane, which does not contain the weld bead and a direction of motion of the second pass is opposite to a direction of motion of the first pass for full depth penetration;
   wherein delivery of the laser beam in the second pass is carried out with the welding nozzle inclined at an angle 20°-45° from normal of the weld bead, and
   wherein the beam of the first pass has a long pulse duration of 1 ms-100 ms.

2. The method as claimed in claim 1, wherein the beam of the first pass has a pulse energy in the range of 100 mJ-1000 J.

3. The method as claimed in claim 1, wherein delivery of the laser beam in the first and second pass on the material to be welded is accomplished by a fiber optic beam delivery system with a suitable focusing objective to achieve a focus spot diameter such that the peak power density of the first pass and a peak power density of the second pass are both below the peak power density required for evaporation of the surface of the material to be welded.

4. The method as claimed in claim 1, wherein a power density of the laser beam in first pass is in the range of $10^4$-$10^8$ W/cm$^2$.

5. The method as claimed in claim 1, wherein the laser beam in the first pass is operated at a repetition rate of 1-100 Hz.

6. The method as claimed in claim 1, wherein generation of the laser pulse in first and second pass is accomplished by a master oscillator or master oscillator power amplifier (MOPA) configuration of a laser system.

7. The method as claimed in claim 1, wherein the a power density of the laser beam in the second pass is $10^3$-$10_6$ W/cm$^2$.

8. The method as claimed in claim 1, wherein a step of cooling of the weld bead between the pulses thereby providing a low heat affected zone is accomplished by controlling the pulse repetition rate.

9. The method as claimed in claim 1, which is performed in an inert atmosphere by purging of an inert gas through the welding nozzle and also a jet of the inert gas being purged tangentially on the weld bead in a direction opposite to a direction of motion of a job protecting an oxidation of the weld bead.

* * * * *